Dec. 11, 1962 W. J. KINDERMAN 3,067,623
TRANSMISSION OF MOTION FROM CLOSED SPACE
Filed Sept. 24, 1959 4 Sheets-Sheet 1
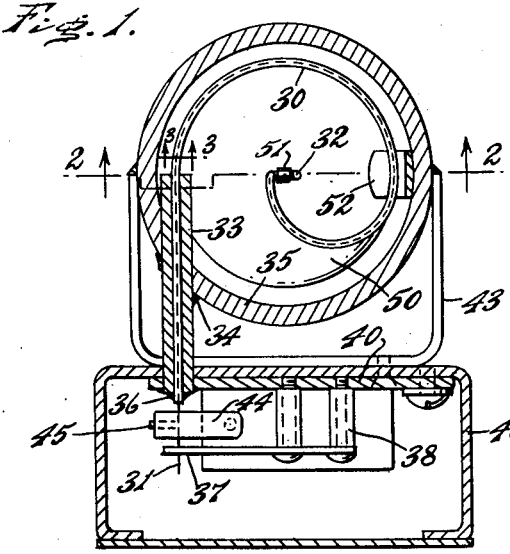
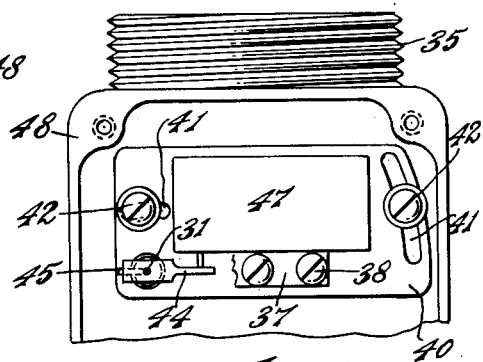
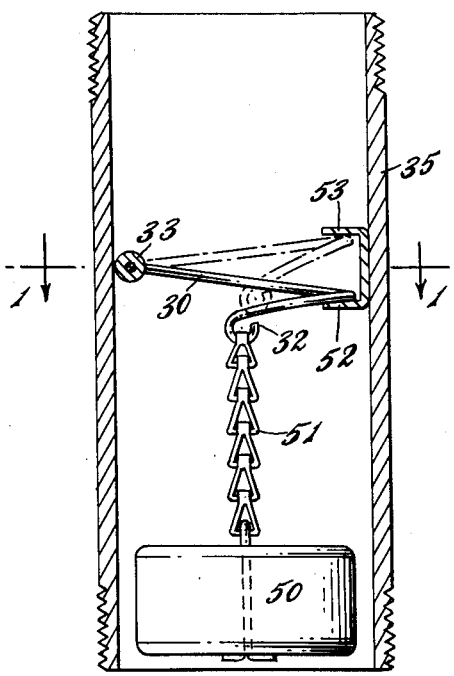
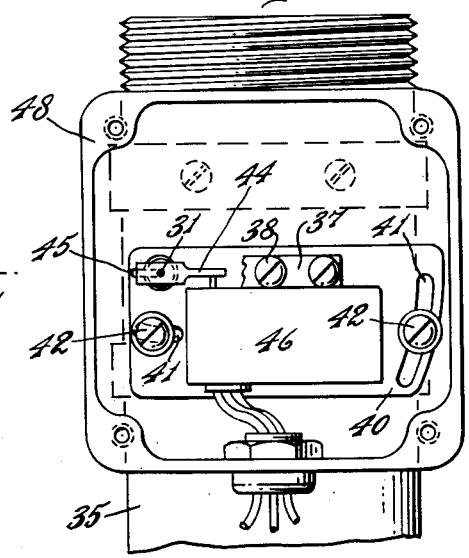
INVENTOR
Walter J. Kinderman
BY
ATTORNEYS

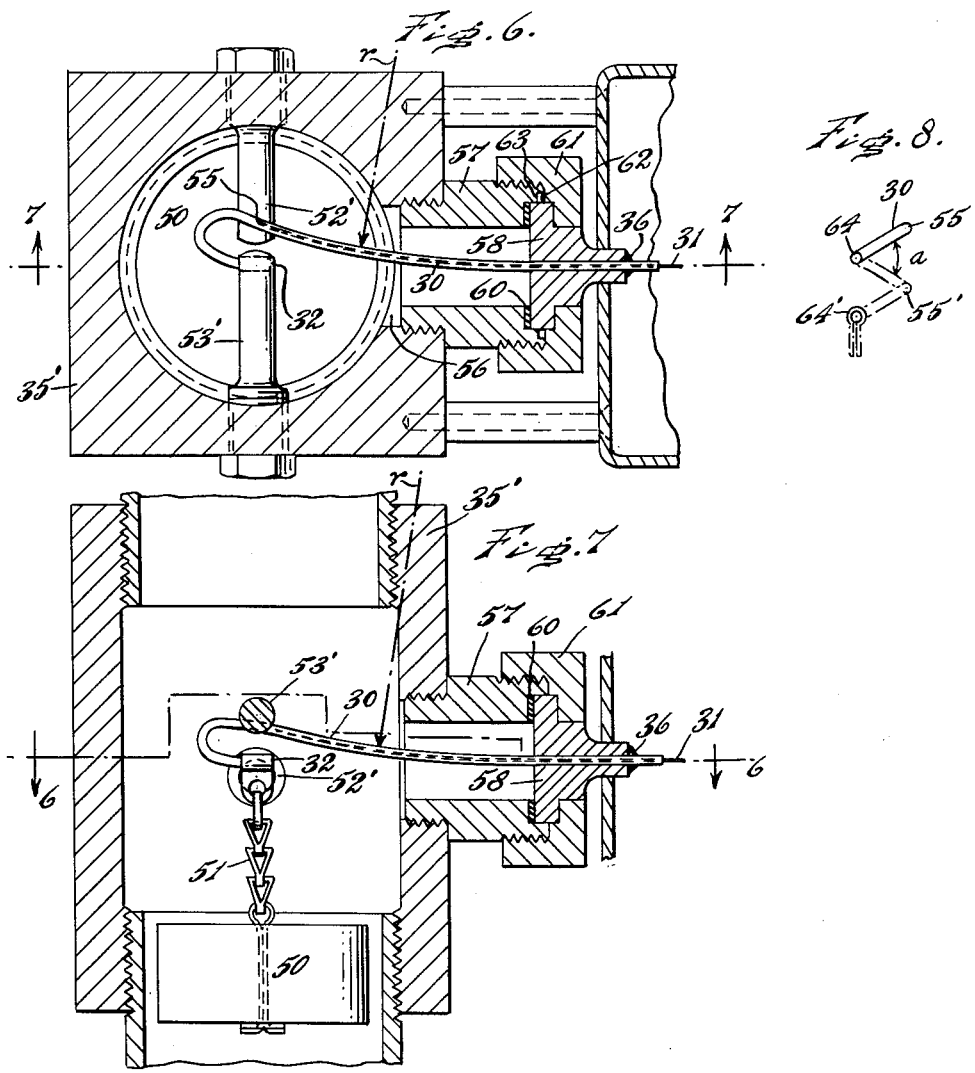

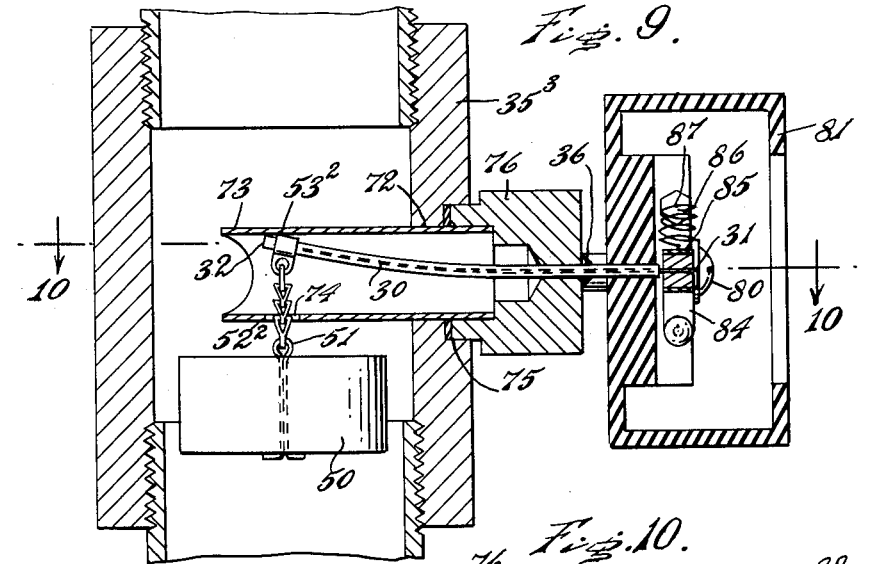
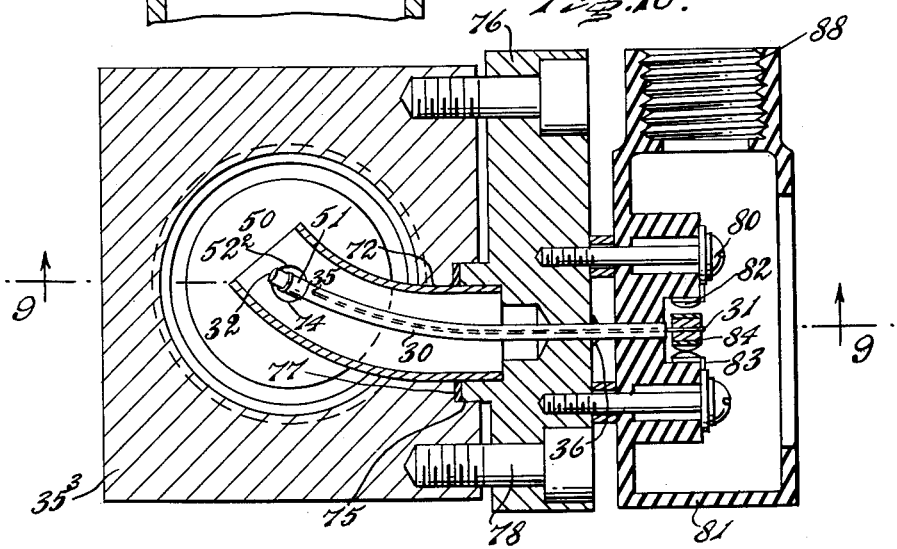
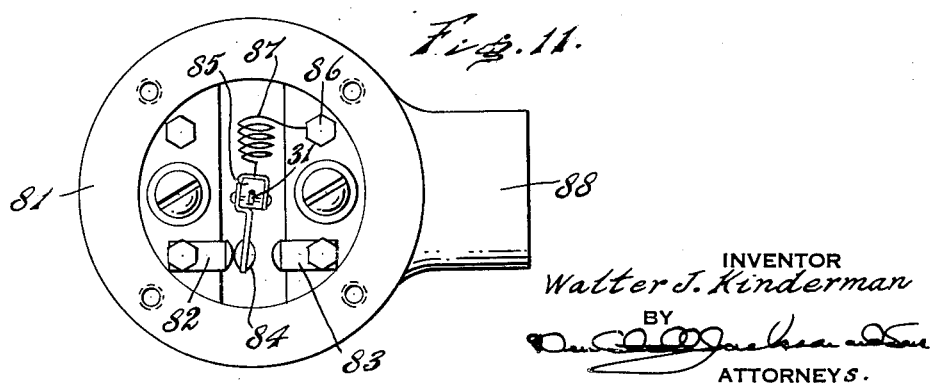

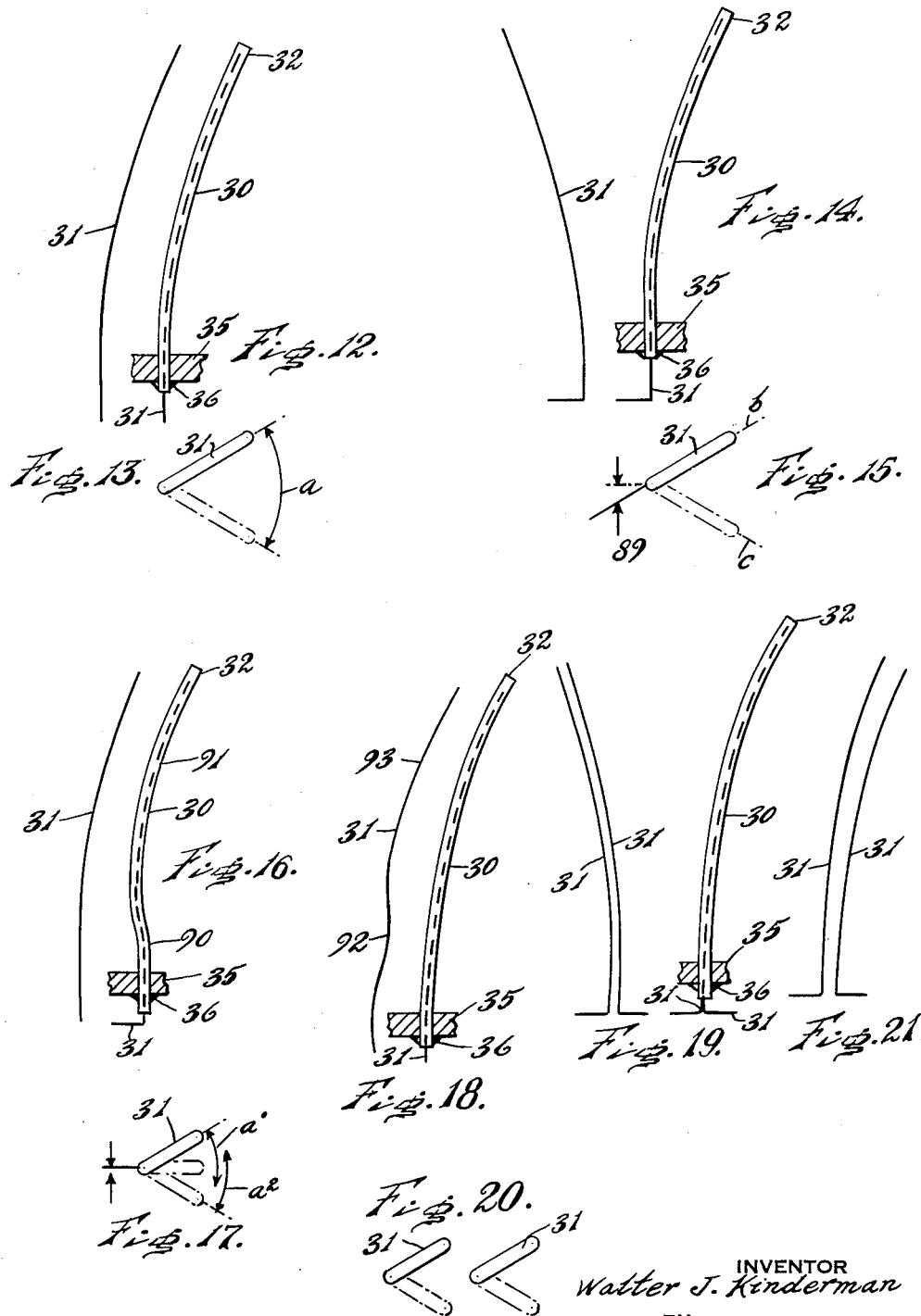

United States Patent Office 3,067,623
Patented Dec. 11, 1962

3,067,623
TRANSMISSION OF MOTION FROM CLOSED SPACE
Walter J. Kinderman, Philadelphia, Pa., assignor to Yarnall-Waring Company, Chestnut Hill, Pa., a corporation of Pennsylvania
Filed Sept. 24, 1959, Ser. No. 842,076
8 Claims. (Cl. 74—17.8)

The present invention relates to improved mechanism for transmission of motion from or to an enclosed space.

A purpose of the invention is to increase the simplicity and reduce the expense of devices for transmitting motion from or to a closed space.

A further purpose is to greatly reduce the bulk of motion transmitting devices which operate from or to a closed space.

A further purpose is to obtain snap action from a motion transmitting device operating from or into a closed space.

A further purpose is to increase the sensitivity and accuracy of movement response from or to an enclosed space.

A further purpose is to minimize the effect of high pressure differential on the transmission of motion to or from an enclosed space.

A further purpose is to employ one simple design to serve for a wide range of differential pressure applications in the transmission of motion to or from an enclosed space.

A further purpose is to transmit multiple signal response to and from an enclosed space simply and effectively.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a sectional plan view of one embodiment of the device of the invention, the section being taken on the line 1—1 of FIGURE 2. In the form of FIGURE 1 the core wire when free is straight or slightly curved and the elastic tube when free is helical, and the core wire is fastened to the tube at the free end of the tube.

FIGURE 2 is a vertical section of the device of FIGURE 1 on the line 2—2.

FIGURE 3 is an enlarged section of the elastic tube and core wire in the device of FIGURE 1.

FIGURE 4 is a fragmentary front elevation of the device of FIGURES 1 to 3, omitting the cover plate.

FIGURE 5 is a view similar to FIGURE 4 showing a variation.

FIGURES 6 to 8 show a modified form of the device of the invention, which gives continuous response of the core wire at the free end, the core wire not being fastened to the tube.

FIGURE 6 is a sectional plan view of a variation of the invention, the section being taken on the line 6—6 of FIGURE 7.

FIGURE 7 is a fragmentary vertical section of the device of FIGURE 6 sectioned on the line 7—7.

FIGURE 8 is a diagram showing the operation of the elastic tube in the device of FIGURES 6 and 7.

The form of FIGURES 9, 10 and 11 illustrates a device of the invention which produces snap action, the wire not being fastened to the elastic tube. This is the preferred embodiment of the invention.

FIGURE 9 is a vertical section on the line 9—9 of FIGURE 10.

FIGURE 10 is a sectional plan on the line 10—10 of FIGURE 9.

FIGURE 11 is a front elevation of the device of FIGURES 9 and 10.

FIGURE 12 is a diagram showing the elastic tube including the core wire, and also the core wire itself in free condition as employed in the form of FIGURES 6 to 8.

FIGURE 13 is a diagram looking from the side showing the response of the elastic tube and core wire of FIGURE 12.

FIGURE 14 is a diagram of the elastic tube with the core wire, and also the core wire free, showing the relationship of the form of FIGURES 9 to 11.

FIGURE 15 is a diagram viewed from the side showing the response of the elastic tube and core wire in the form of FIGURE 14.

FIGURE 16 is a diagram similar to FIGURE 14 of a modified form having partially continuous and partially snap action, obtained by preforming the tube.

FIGURE 17 is a diagram viewed from the side showing the response of the device of FIGURE 16.

FIGURE 18 is a diagram similar to FIGURE 16 showing a further variation in which the non-uniform response is provided by preforming the core wire rather than preforming the elastic tube.

FIGURE 19 is a diagram similar to FIGURE 14 showing a form in which a plurality of core wires is used.

FIGURE 20 is a diagram viewed from the side showing the response of the elastic tube and core wire of FIGURE 19.

FIGURE 21 is a diagram similar to a portion of FIGURE 19 and showing a variation in the core wires only of FIGURE 19.

Describing in illustration but not in limitation and referring to the drawings:

There are numerous requirements for transmission of motion through a pressure-tight or leak-tight wall which may be referred to for convenience as a closed or sealed wall.

This may arise because of the desire to maintain a pressure differential between the closed chamber space and the outside, as in the case of a steam boiler or other pressure vessel. Similar requirements may arise where it is desired to confine chemicals or other materials within a closed space, either to prevent loss of such materials, or to prevent injury to personnel where the materials are toxic or otherwise hazardous.

The need to transmit motion from the closed space may be due to the desire to obtain a response outside the closed space which indicates the condition within the closed space as in an instrument, such as a liquid level gauge, a position indicator, a flow meter, or the like.

The need to transmit motion may also arise by reason of a desire to open or close valves or otherwise manipulate devices inside or outside the closed space. Since the motion transmission is reversible, it will be evident that if the transmitting impulse arises within the closed space the responding impulse will occur outside the closed space and, on the other hand, if the transmitting impulse arises outside, the responding impulse will be inside.

For convenience in explanation, the invention will be explained as applied to a liquid level gauge, in which case the purpose of the motion transmitting device is to transmit an indication or response outside of the closed space. It should be recognized, however, that a wide variety of other uses is contemplated as later explained.

It is old in the art to torsion-strain a straight tubular wall extension of a pressure wall in a closed chamber from inside the chamber and obtain response of a protruding core member rigidly attached to the free end of the tube which projects into the pressure chamber.

While the above devices are capable of giving good performance, they are subject to the disadvantage that they are very bulky, and complicated, requiring guides and rather elaborate accessory supports which make the devices costly to produce.

It has been discovered by the present inventor that the follower member which has previously been free from all response and reaction strain can itself be elastically strained in directions other than that of the desired response without materially impairing its follow-up functions in response to the measured variable. Thus a core wire which extends with clearance through a torsion tube can be subject to elastic bending with curvature of the tube and still respond to torsional strain imposed upon the tube. Thus it is possible to form a straight elastic tube to a curvature corresponding to a component of a helical spring, which can be uniformly strained in torsion by application of a load at a point corresponding to the center of curvature.

By this means it is possible to eliminate supports previously required to offset bending and obtain response to direct loading similar to the loading of a tension spring. This leads to a very compact and symmetrical arrangement. Friction between the elastic tube and the core wire or follower wire can be eliminated by lubrication, and where elevated temperature is involved as in a steam boiler or reaction vessel, a permanent lubricant such as flake graphite or flake molybdenum sulfide or the like may be used, with proper protection against contamination, dilution and loss.

The bending stresses in the core wire resulting from the circular elastic deflection of the initial straight core wire are balanced by the reaction forces in the elastic tube, and all are essentially at right angles to the torsion forces in the plane of the tube section. In the absence of end restraint, the core wire which is elastically deflected from the straight wire condition will be subject to torsional strain and will with negligible friction assume a position corresponding to that of the so-called free end of the tube, that is, the end which is remote from the point at which the tube is secured to the pressure wall. At the protruding end the core wire will therefore be rotationally displaced with respect to the tube end sealed in the wall by the torsional strain angle through which the tube moves.

This feature in practice is reduced by the torsional friction moment and the torsional drive reaction imparted to the core wire by the loading of the response system which is typical of these systems in general.

Considering now the form of FIGURE 1, the elastic tube 30, preferably made of a metal such as steel, stainless steel, beryllium copper, or the like, contains extending through its interior bore an elastic spring core wire 31 which is preferably formed of a spring metal such as steel, stainless steel or beryllium copper. If desired in special applications, the elastic tube and the core wire, either or both, may be made of a plastic exhibiting spring properties such as nylon (linear polyamide).

The inner or free end 32 of the elastic tube is sealed as by welding, and the outer end of the elastic tube passes through a guide tube 33 which suitably intersects the helical elastic tube adjacent the tangent, and which is conveniently straight and secured and sealed as by welding at 34 where it passes through the wall of pressure vessel 35, in this case suitably a liquid level gauge of a boiler or the like. The elastic tube is sealed to the guide tube 33 or the like as by brazing, welding or silver soldering at 36 at the outer end.

Beyond the elastic tube the spring core wire 31 protrudes and is provided with a rotational bearing support on bearing element 37 supported by bolts and washers 38 from a plate 40 which has slots 41 and is adjustably mounted by screws 42 to a bracket 43 secured to the wall of the pressure vessel.

Actuating arm 44 is clamped to the end of the core wire beyond the elastic tube by set screw 45 so that the arm responds to core wire movement produced by movement of the elastic tube within the pressure chamber and in proper position as shown in FIGURE 4 will actutae electric switch 46 on downward motion or if desired in the alternate form of FIGURE 5 will actuate electric switch 47 on upward motion. If desired both switches may be placed in a single junction box 48 which can be suitably closed.

A so-called float or displacement body 50 is suspended on a suitable hook portion of the elastic tube 30 at the free end by chain and fastener combinaion 51. The displacement body is desirably made of a light corrosion resisting material such as sintered electrode carbon, ceramic or a light metal suitably protected against corrosion.

The relations of the spring tube to the displacement member are such that when the liquid level to which the equipment responds is below the displacement body, the elastic tube approaches the lower limiting stop 52, best seen in FIGURE 2, but when the liquid rises and the displacement body has reduced effective weight due to the displaced liquid, the elastic tube and the displacement body assembly moves until the elastic tube engages the upper stop 53.

The relative rotation of the spring core wire with respect to the elastic tube causes the electric switch to open and close with respect to high and low liquid level limits. If double contacts are used, separate electric circuits can be actuated as desired, causing indication lights or the like to be energized. The choice of whether or not to use a separate switch as shown in FIGURE 5 is a matter of convenience.

The level control with the switch can be facilitated by using a displacement body 50 of the same volume but of smaller diameter and correspondingly greater length. Thus the liquid level range will be extended without changing other components.

It has been found that in the device of FIGURES 1 to 4, the elastic tube is conveniently made of austenitic stainless steel having an outside diameter of 0.035 inch and a wall thickness of 0.005 inch, and having a core wire of austenitic stainless steel with a diameter of 0.020 inch. This gives adequate clearance. In another embodiment, the elastic tube has an outside diameter of 0.062 inch and a wall thickness of 0.005 inch and the core wire has a diameter of 0.047 inch. The above proportions were used with a pressure wall of 2 inches pipe size. Finely divided molybdenum sulfide has been found to be very effective as a lubricant between the core wire and the elastic tube. Good results have been obtained, however, without using lubrication.

With larger assemblies, correspondingly larger actuating forces will be obtained with a higher degree of positive action as desired.

The electrical components are spaced by bracket 43 from the pressure container, and this will serve to keep them cool where the pressure container is connected with a steam boiler.

It will of course be evident htat the electrical actuation may be direct or utilize relays if desired.

The form of FIGURES 1 to 5, unlike the other forms of the invention referred to below, has the core wire fastened or joined in the weld at the free end 32 of the elastic tube.

It is advantageous in many cases to employ a core wire which is not fastened to the elastic tube but which orients with respect to it to establish the lowest retained energy of the mechanical system.

In FIGURES 6, 7 and 8, I illustrate a form of the device of the invention in which the elastic tube 30 is formed to a rather large radious of curvature $r$ so as to displace the tube sections 54 off-center in both vertical and horizontal planes as shown. The tube 30 near the free end has a reverse bend or hook. The core wire 31 passes through the tube throughout the curved section having the radius $r$ and terminates at 55, but is nowhere fastened to the tube. In its free condition the tube and core wire move beyond the position shown, and upward motion is restrained by upper stop 53' extending in from the side wall of the pressure chamber, and in lower position stop 52' restrains motion of the elastic tube and core wire.

In this form the core wire before being inserted into the elastic tube is formed preferably into the same curvature as the tube preferably on radius $r$. The core wire is then inserted into the tube shown to the point 55. In the form illustrated there is a window 56 in the side of the pressure chamber 35' and into the window is threaded extension 57 which receives elastic tube mounting fitting 58 gasketed at 60 and held in place by gland 61. The elastic tube passes through the fitting 58 and is sealed to it as by welding, brazing or silver soldering at 36. The fitting has a radial pin 62 which is seated in a radial groove 63 on the extension 57 to obtain proper angular registry of the fitting and elastic tube with respect to the vertical axis of the pressure chamber.

As the liquid level in the pressure chamber drops below the displacement body 50, the load applied to the sealed free end 32 of the elastic tube 30 will increase to an extent corresponding to the weight of the displaced liquid, and the tube will correspondingly be deflected downwardly.

FIGURE 8 shows the movement as viewed from the side with respect to the elastic tube and core wire, with the point of float suspension 64 moving from 64 to 64' and the point 55 moving from 55 to 55'. It will be evident that the core wire will move with the tube at 55 and will remain positionally stationary at the point outside the elastic tube at which it is suitably connected to an actuating element 44 (not shown in FIGURES 6 to 8, and shown in FIGURES 1 to 5). In response to the position of lowest energy at deflection, it is clear that the core wire throughout its length will turn through an angle $a$ with respect to the tube rather than flex with the tube. This causes a rotational response at the end of the core wire outside the tube.

It will be evident that it is unimportant in the present invention whether electrical operation is obtained by mounting a switch on the core wire at the end outside the tube, as for example using a mercury switch, or by using a movable contact arm connected with the core wire or by using a switch actuator on the core wire as previously described.

In considering the form of FIGURES 6 to 8, it will be evident that although the simplest embodiment of this device will provide suspension of the displacement body 50 at the point 55 on the elastic tube, this would require corresponding off-center location of the extension 57 and the window 56 to bring the displacement body into central position in the pressure chamber. In the alternative, if both ends of the elastic tube were aligned radially to the pressure chamber, the tube angle at the free end would be off-set from the radial position, which would introduce awkward and expensive machining problems. The feature here discussed wil be clear when FIGURES 9 to 11 are considered, since in FIGURES 9 to 11 the suspension of the displacement body 50 is provided at the point 55.

The preferred embodiment of the device for purpose of manufacture appears in FIGURES 9, 10 and 11. This form is interesting particularly because it produces snap actuation. The movement of the core wire is limited by stops, conveniently provided by switch contacts. In a convenient form of the device as later explained, the preformed core wire has the same numerical curvature as the elastic tube, but it is positioned 180 degrees out of phase so that the effect of the residual stress in the spring core wire when it is bent to conform with the tube is opposed to the action of the elastic tube. The core wire extends through the tube to the point 35 near the free end, but is not secured by welding or otherwise to the tube. As shown in FIGURES 11, 12 and 13, the chamber wall $35^3$ has a side window 72 which receives a curved tube 73 having a bottom opening 74 through which the suspension 51 passes to connect the float with the sealed free end 32 of the elastic tube 30. The top of the tube 73 acts as the stop $53^2$ and the bottom of the tube acts as the bottom stop $52^2$ for the elastic tube 30.

The window is surrounded by a packing recess 75 which receives a packing gland 76 to engage and compress a gasket 77. The packing gland has an opening through which the tube 30 passes and the tube is secured and sealed by welding, brazing or silver soldering at 36. The packing gland 76 is held in place by bolts 78.

The packing gland has secured thereto by bolts 80 a suitably insulating switch mounting box 81 which has spaced contact strips 82 and 83 which are selectively engaged by a movable contact element 84 which is mounted on the core wire by an insulating block 85 secured against rotation on the core wire by a set screw (not shown). Electrical connection from a termnial 86 to the movable contact 84 is made by pigtail 87. The switch box has a conduit connection at 88.

Remembering that the preformed core wire 31 is 180 degrees out of phase in its preform with respect to the curvature of the elastic tube, it will be evident that at the point of balance (maximum elastic retained energy), there will be a tendency for release and a slight deflection of the tube in either direction will induce movement of the core wire toward elastic energy release. The stop action of the contacts 82 and 83, however, limits movement in either direction to a slight displacement.

Upon return movement of the elastic tube to a position of overbalance in the opposite direction, the spring core wire will snap to a limiting position against the opposite contact stop. This operation will be understood if one thinks of a snap action linkage commonly used in a push button switch or a snap action disc which is based upon axial motion of the center to release bending stresses. In the present device, response is based on movement of the core wire to a position of lowest energy retention with respect to the elastic tube and within the latitude of permissible motion. This combination includes the essential elements for switch movement and provides a highly efficient switch combining response through a pressure wall with snap action.

To better understand this action, it will be well to compare the continuous response with the snap action.

FIGURE 12 shows an elastic tube 30 which is formed into a curve to the right as shown. If the core wire 31 were removed from the tube it would have a curvature also to the right, which would preferably be substantially the same as the curvature of the tube. The core wire is not fastened to the tube. The wire rotation angle $a$ is illustrated in FIGURE 13 showing the continuous response effect which is obtained by this combination and which has already been described in FIGURES 6 to 8.

On the other hand let us consider a conditon in which the elastic tube 30 curves to the right as shown in FIGURE 14 and the core wire 31 when in the tube conforms to the curvature of the tube. The core wire is not fastened to the tube. But, when the core wire 31 is free as shown at the left in FIGURE 14, the core wire curves to the left, 180° out of phase with the curvature of the elastic tube, but suitably with the same numerical curvature as shown. This results in a snap action of the core wire between position $b$ and position $c$, as shown in FIGURE 15. This can cause snap closure in a switch 89.

In some cases snap action follow-up may be superimposed upon a continuous response as shown in FIGURES 16 to 18. This can be accomplished with a core wire not fastened to the tube by providing on the tube 30 within the freely moving portion, a zone 90 which curves to the left and a zone 91 which curves to the right, along with a core wire 31 which curves to the right suitably according to the curvature of zone 91, as in FIGURE 16, or it may be accomplished by an elastic tube 30 which curves to the right uniformly as in FIGURE 18 with a core wire 31 which curves first to the left at 92 and then to the right at 93 when free. In either case there will be continuous response of the core wire in moving down through angle $a'$ and then a snap the rest of the way, and a continuous response in moving up through angle $a^2$ and then a snap the rest of the way. The retardant forces on the core wire in FIGURES 16 to 18 are lower than the retardant forces in FIGURES 14 and 15.

In some cases it is desirable to have more than one point of response, so that different circuits can be controlled or the like. Thus in FIGURE 19 there are two core wires with their curvature in the tube 30 180° out of phase from their curvature when free of the tube similar to that described in FIGURE 14. The core wires extend through the tube but are not fastened to it. Snap action is obtained (see FIGURE 20) just as described in connection with FIGURES 14 and 15. The different wires can be extended to different distances and can operate different actuators as desired.

As suggested by FIGURE 21, there can be multiple core wires in the elastic tube which have curvatures in the same direction as the elastic tube to obtain continuous response as shown in FIGURES 12 and 13.

By showing two core wires, it is intended to indicate that any suitable plurality of core wires can be used.

While the invention has been illustrated and described with special reference to a liquid level gauge, it will be evident, of course, that measurement of flow by velocity impingement, differential pressure across an orifice by means of a diaphragm differential pressure gauge, or measurement of density or velocity can be obtained by use of the invention. The invention can also be used to indicate rotations of a rotor type flow element.

The user need not be concerned for fear the elastic tube will be unable to withstand a high pressure. Because of the small section of the elastic tube which will preferably be used and the relatively heavy wall, the stresses due to the contained pressure are relatively low and do not constitute a serious design problem when dealing with normal steam pressures. For example, an elastic tube of steel or beryllium copper may have an outside diameter of 0.040 inch with a wall thickness of 0.005 inch and this will develop a stress in the wall due to the contained pressure equal to three times the contained pressure in p.s.i. Thus if the yield strength of the material of the tube is 180,000 p.s.i., it can withstand a contained pressure up to 60,000 p.s.i. This figure is somewhat lowered by the superimposed bending stresses, but it is quite clear there is a large margin of excess strength over requirements since only about 10 percent of this maximum stress limit would be developed in steam power plant applications.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. In motion transmitting mechanism, a chamber wall defining a closed chamber, an elastic metal tube sealed and fixed with respect to the chamber wall, extending into the chamber, having a closed free end inside the chamber and having a longitudinally curved stretch of the tube inside the chamber and between the chamber wall and the free end, a spring metal core wire extending through the inside of the tube and through the curved stretch of the tube in contact with the tube but free to turn with respect to the tube, and extending out at the other end beyond the tube and outside the chamber, means inside the chamber but outside the tube operably engaged with the tube for the tube to be elastically deflected laterally of the tube and for torsional force to be applied to the tube and varied as a function of the lateral deflection, correspondingly to elastically deflect the core wire laterally adjacent the free end of the tube and torsionally deflect the core wire so as to elastically bend the portion of the core wire inside the chamber and axially turn the portion of the core wire outside the chamber, and means connected to the core wire outside the tube turning in response to turning of the core wire.

2. A mechanism of claim 1, in which the core wire is connected to the tube at the end of the core wire which is inside the tube.

3. A mechanism of claim 1, in which the core wire is unconnected to the elastic tube.

4. A mechanism of claim 1, in which said core wire is biased by its spring properties toward longitudinal curvature.

5. A mechanism of claim 1, in which said core wire and said tube have a spring bias of curvature in the same direction.

6. A mechanism of claim 1, in which said core wire and said tube have a spring bias in the same direction of curvature and of the same magnitude.

7. A mechanism of claim 1, in which said core wire and said tube have spring biases of curvature in opposite directions, whereby said core wire stores energy and undergoes snap actuation.

8. A mechanism of claim 7, in which the said opposite spring biases are equal.

References Cited in the file of this patent

UNITED STATES PATENTS

| | | |
|---|---|---|
| 1,375,131 | Cox | Apr. 19, 1921 |
| 1,827,560 | Binckley | Oct. 13, 1931 |
| 2,607,233 | Bosch | Aug. 19, 1952 |
| 2,725,445 | Bosch | Nov. 29, 1955 |
| 2,784,597 | Miller | Mar. 12, 1957 |
| 2,877,994 | Jones | Mar. 17, 1959 |

FOREIGN PATENTS

| | | |
|---|---|---|
| 640,304 | France | Mar. 24, 1928 |